United States Patent [19]

Yoshioka et al.

[11] Patent Number: 4,774,278

[45] Date of Patent: Sep. 27, 1988

[54] COATING COMPOSITIONS

[75] Inventors: Hiroshi Yoshioka; Ichiro Ono; Hideki Sugahara, all of Gunma, Japan

[73] Assignee: Shin-Etsu Chemical Co., Ltd., Tokyo, Japan

[21] Appl. No.: 911,901

[22] Filed: Sep. 25, 1986

[30] Foreign Application Priority Data

Oct. 1, 1985 [JP]  Japan ................................ 60-218863

[51] Int. Cl.$^4$ ...................... C08L 61/10; C08L 63/00; C08L 75/04; C08L 27/06
[52] U.S. Cl. .................................. 524/506; 525/102; 525/446; 525/453; 525/477; 525/474
[58] Field of Search ............... 525/446, 453, 477, 102; 524/506

[56] References Cited

U.S. PATENT DOCUMENTS

| Re. 30,431 | 11/1980 | Falender et al. | 525/102 |
|---|---|---|---|
| 2,884,388 | 4/1959 | Hedlund | 525/477 |
| 3,642,936 | 2/1972 | Hodge et al. | 525/453 |
| 4,265,801 | 5/1981 | Moody et al. | 525/446 |
| 4,413,102 | 11/1983 | Tanaka et al. | 525/453 |
| 4,670,500 | 6/1987 | Gupta | 525/102 |

FOREIGN PATENT DOCUMENTS 731223  3/1966  Canada ................................ 525/102

Primary Examiner—Wilbert J. Briggs, Sr.
Attorney, Agent, or Firm—Jules E. Goldberg

[57] ABSTRACT

An improved coating composition is proposed which comprises a conventional resin component for coating admixed with a silicone resin in combination with an organopolysiloxane having specified substituent groups in an object of forming non-skid coating films imparted with non-blocking property at the same time.

1 Claim, No Drawings

COATING COMPOSITIONS

BACKGROUND OF THE INVENTION

The present invention relates to a coating composition capable of giving a surface coating having improved surface properties. Generally, coating films formed by application of a conventional coating material have disadvantages such as damage and stain or dullness of the surface when coming into contact with other bodies. The undesirable tendency is particularly prominent when the coating film formed of the coating material has relatively low mechanical strength.

That is, finished plywood boards prepared by coating with a nitrocellulose lacquer, an aminoalkyd resin coating or a polyurethane coating and steel sheets coated with an acrylate coating or so-called precoated steel sheets and the like, for example, have shortcomings including sticking together and damage or appearance of dullness of film surfaces when they are placed in a stack or as rolled in a coil and, furthermore, breaking of coating films when a pressure-sensitive adhesive tape is applied and then peeled off due to partial transfer of the coating film to the adhesive tape, Moreover, such coating-finished plywoods have another disadvantage of a so-called blocking phenomenon during processing of them using an adhesive at the time of removal of the contaminating adhesive from the coated surface because the coating film is also removed as being carried by the adhesive.

In consideration of the above, there have been made several proposals with an object of removing such disadvantages including a coating composition by admixing a dimethyl silicone fluid or a polyether-siloxane copolymer with the coating material (Japanese Patent Publication No. 47-18985), a coating composition admixed with an aminoalkyl-substituted organopolysiloxane copolymer (Japanese Patent Publication No. 48-4367), a coating composition admixed with a mercaptoalkyl-substituted organopolysiloxane copolymer (Japanese Patent Publication No. 53-20530) and the like. However, the phenomenon of blocking is ineffectively prevented by the addition of dimethyl silicone fluid notwithstanding the superior performance thereof in levelling of film surfaces, prevention of the so-called "flooding" which means separation of pigment components and the like sometimes accompanied by another disadvantage of cratering or scission in the coating films due to the silicone. The use of the polyether-modified organopolysiloxane copolymer or the aminoalkyl-substituted organopolysiloxane copolymer gives no sufficient effect of anti-blocking and may induce the phenomenon of blocking by the prolonged or repeated contact of pressure-sensitive adhesive tapes although they do not cause the phenomenon of cratering or scission of the coating films. A marked effect of anti-blocking is obtained by the addition of a mercaptoalkyl-substituted organopolysiloxane copolymer but only with little effect in polyurethane-based coating materials.

SUMMARY OF THE INVENTION

The present invention has an object to provide a coating composition without the above described disadvantages and capable of forming non-skid coating films with excellent anti-blocking property prepared by admixing a silicone resin and an organopolysiloxane with a conventional coating material.

The coating composition of the invention comprises:
(1) 100 parts by weight of a coating material, the amount being calculated as the organic resin component therein;
(2) from 0.1 to 30 parts by weight of a silicone resin; and
(3) from 0.001 to 15 parts by weight of an organopolysiloxane having substituting groups selected from the class consisting of aminoalkyl groups, mercaptoalkyl groups and dihydroxyalkylamino-substituted hydrocarbon groups.

DETAILED DESCRIPTION OF THE PREFERRED EMBODIMENTS

The inventors have completed the present invention as a result of the extensive investigations with an object of obtaining a coating composition having an excellent anti-blocking property above all on the basis of the discovery that coating compositions capable of forming a non-skid coating film with a marked anti-blocking property can be obtained by admixing a conventional silicone resin and a specific organopolysiloxane with substituting groups selected from the class consisting of aminoalkyl groups, mercaptoalkyl groups and dihydroxyalkylamino-substituted hydrocarbon groups with the component of ordinary coating materials.

The coating material as the first component in the coating composition of the invention can be selected from prior art coating materials such as oil paints or varnishes, aqueous coatings, spirit varnishes, cellulosic coatings and synthetic resin coatings. Examples thereof are phenol-formaldehyde resin coatings, aminoalkyd resin coatings, epoxy resin coatings, polyurethane coatings and the like and various aqueous emulsion coatings based on, for example, polyvinyl chlorides, polyvinyl acetates, polyacrylate resins and the like.

The silicone resin as the second component added to the above coating material may be selected from those usually called a silicone varnish containing siloxane linkages and having substituting groups crosslinkable by heating or by exposure to light in their molecules. Silicone varnishes are classified into unmodified and modified silicone varnishes. The unmodified silicone varnishes are exemplified by those of the methyl silicone-based and methyl phenyl silicone-based ones and represented by the average unit formula

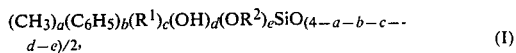
$(CH_3)_a(C_6H_5)_b(R^1)_c(OH)_d(OR^2)_eSiO_{(4-a-b-c-d-e)/2}$, (I)

in which $R^1$ is a monovalent hydrocarbon group as exemplified by ethyl, propyl, butyl, amyl, hexyl, octyl, decyl, dodecyl, vinyl, allyl, phenethyl and 1-methyl phenethyl groups, $R^2$ is an alkyl group having 1 to 4 carbon atoms such as methyl, ethyl, propyl and butyl groups, and the subscripts a, b and c are each zero or a positive number smaller than 2, the subscript d is zero or a positive number smaller than 1 and the subscript e is zero or a positive number smaller than 3 with the proviso that $0.7 < a+b+c < 2$ and $0.7 < a+b+c+e < 3$.

The modified silicone resins are exemplified by those prepared from a methyl phenyl silicone resin represented by the average unit formula

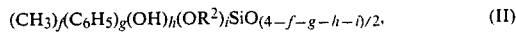
$(CH_3)_f(C_6H_5)_g(OH)_h(OR^2)_iSiO_{(4-f-g-h-i)/2}$, (II)

in which $R^2$ has the same meaning as defined for the preceding formula (I) and the subscripts f and g are each zero or a positive number smaller than 2, the subscript h is a positive number not exceeding 2 and the subscript i is a positive number not exceeding 3 with the proviso that f+g is larger than 0.7 but not exceeding 2, h+i is larger than 0.2 but not exceeding 3 and f+g+h+i is larger than 0.9 but not exceeding 3, by the dehydration or dealcoholation reaction between the hydroxyl groups or alkoxy groups contained therein with a compound represented by the general formula Z—OH in which Z is a residual group selected from residual groups of alkyd resins, epoxy resins, acrylate resins, polyesters, phenolformaldehyde resins, melamine-formaldehyde resins and polyurethanes.

The above described silicone resins are conventionally used as a vehicle component in coating materials or a binder for inorganic materials such as glass fibers, mica flakes and the like in parallel with the use as an additive to coating materials for imparting heat-resistance, weatherability or electrical insulation, although they are used in the coating compositions of the invention with an object of imparting the non-skid property in conjunction with the non-blocking property to the coating films by the combined use of an organopolysiloxane as the third component described later. The amount of the admixed silicone resin should be in the range of 0.1 to 30 parts by weight per 100 parts by weight of the resin component of the coating material since the silicone resin in an amount smaller than 0.1 part by weight would give an insufficient effect of slip-proofing to the surfaces of the coating film and the silicone resin in an amount larger than 30 parts by weight would give no additional advantageous effect of slip-proofing rather with a disadvantage due to the expensiveness thereof. A more preferred range of the amount of the silicone resin is 0.5 to 15 parts by weight per 100 parts by weight of the resin component in the coating material.

The organopolysiloxane as the third component contained in the coating composition of the invention should have at least one substituting group selected from the class consisting of aminoalkyl groups, mercaptoalkyl groups and dihydroxyalkylamino-substituted hydrocarbon groups in a molecule. They have an effect of imparting the desired anti-blocking property to the surface of the coating films.

These organopolysiloxanes may be selected from those known in the prior art. For example, the aminoalkyl-substituted organopolysiloxane contains a siloxane unit having a group represented by the general formula $X-R^3-$, in which X is $NH_2-$, $NH_2CH_2CH_2NH-$ or $NH_2CH_2CH_2NHCH_2NH-$, and $R^3$ is a divalent hydrocarbon group having 1 to 12 carbon atoms. The mercaptoalkyl-substituted organopolysiloxane contains a siloxane unit having a group represented by the general formula $HS-R^3-$, in which $R^3$ has the same meaning as defined above. The organopolysiloxane substituted by dihydroxyalkylamino-substituted hydrocarbon groups contains a siloxane unit having a group represented by the general formula $YR^3-$, in which Y is a group expressed by the formula $HO-CH_2CH(OH)CH_2NH-$, $HO-CH_2CH(OH)CH_2NHCH_2CH_2NH-$ or $HOCH_2CH(OH)CH_2NHCH_2CH_2N(CH_2CHOHCH_2OH)-$ and $R^3$ has the same meaning as defined above. Accordingly, the modified organopolysiloxane should contain in a molecule thereof at least one siloxane unit represented by one of the following formulas $(X-R^3)(R^4)_p(Z)_q SiO_{(4-p-q)/2}$, $(HS-R^3)(R^4)_p(Z)_q SiO_{(4-p-q)/2}$ and $(Y-R^3)(R^4)_p(Z)_q SiO_{(4-p-q)/2}$, in which $R^4$ is a monovalent hydrocarbon group, Z is a hydroxy group or a hydrolyzable group, each of p, q and p+q is 0, 1 or 2 and $R^3$, X and Y each have the same meaning as defined above. They may contain siloxane units represented by the general unit formula $R^5_r SiO_{(4-r)/2}$, in which $R^5$ is a monovalent hydrocarbon group and r is a positive number of 1, 2 or 3, in addition to the above indicated substituted organopolysiloxane groups. The molecular structure may be linear chain-like, branched chain-like, cyclic or network-like although organopolysiloxanes of linear molecular structures are preferred in consideration of the object of blocking-preventing effect. The amount of the organopolysiloxane admixed with the coating composition should be in the range of 0.001 to 15 parts by weight per 100 parts by weight of the resin component in the coating material since no sufficient effect of anti-blocking can be obtained by the addition of less than 0.001 part by weight thereof and no additional effect can be obtained by the addition thereof in an amount exceeding 15 parts by weight. A more preferred range of the amount of the organopolysiloxane is from 0.05 to 5 parts by weight per 100 parts by weight of the resin component of the coating material.

The coating composition of the invention can be obtained by mixing together each in a prescribed amount of the above-described coating material, silicone resin and organopolysiloxane. The silicone resin and organopolysiloxane are admixed with the coating material in any desired manner such as addition of them each in the form of a solution in an organic solvent and in the form of an aqueous emulsion prepared by dispersing them in water using a surfactant in the case where the coating material is aqueous. Further, the composition may be admixed optionally with various kinds of additives such as solvents, curing catalysts, pigments, dyes, flatting agents, dispersing agents, levelling agents, anti-foam agents, coupling agents, ultraviolet absorbers, antioxidants and the like each in an adequate amount to meet the requirement.

Examples of the present invention are shown in the following in which the expression "parts" refers to "parts by weight" and the results of testing for film properties described in the examples have been obtained according to the following testing methods.

Blocking prevention:

A pressure sensitive adhesive tape was applied and pressed to the surface of the coating film under a load of 1 kg/cm² and then quickly peeled off the surface. This procedure was repeated at a fixed portion of the coating film until the film became broken, and the number of the repeated applying/peeling of the adhesive tape was recorded.

Static friction coefficient:

Two pieces of precoated plywood cut in a dimension of 35 mm by 75 mm were each coated with the coating composition, and after drying, they were laid one on the other with the coated surfaces contacting together. The static friction coefficient was determined under a load of 200 g at a sliding velocity of 8 mm/second using a static friction coefficient measuring imstrument (Model HEIDON-10 manufactured by Shinto Kagaku Co.) to give the results shown in the tables.

Kinetic friction coefficient:

Two pieces of plywood test panels prepared in the same manner as in the above described method for the static friction coefficient were subjected to determination of the kinetic friction coefficient under a load of 50 g at a sliding velocity of 50 mm/second using a precision kinetic friction coefficient measuring instrument (Model DFPM manufactured by Kyowa Kaimen Kagaku Co.) to give the results shown in the tables.

EXAMPLES 1 TO 20

A polyurethane coating material was prepared by mixing 100 parts of an acrylic polyol resin (Acry-DIC, a trade name, manufactured by Dainippon Ink and Chemicals, Inc.), 15 parts of an isocyanate-type curing agent (Varnock 750, a trade name, manufactured by the same company, supra) and 4 parts of a thinner. The coating material was then admixed with one of the silicone resins A to F described below and one of the organopolysiloxanes a to c described below each in an amount respectively shown in Table 1 to prepare coating compositions No. 1 to No. 14 according to the present invention and coating compositions No. 15 to No. 20 for comparative purpose omitting either one of the admixed components. Test pieces of prefinished polywood were coated with these compositions using a film applicator in a coating amount of 25 to 30 g/m$^2$ and the films were cured by heating for 15 minutes at 60° C. after air-drying. Evaluation of the film properties was carried out of these test pieces to obtain the results summarized in Table 1 substatiating that combined use of the silicone resin and the organopolysiloxane was necessary in order to obtain improvements in both anti-blocking and slip-proofing at the same time whereas a silicone resin admixed alone was effective in slip-proofing but ineffective in blocking prevention and an organopolysiloxane admixed alone was effective in blocking prevention but ineffective in slip-proofing.

Silicone resins

A: $(CH_3)_{1.2}(OH)_{0.04}(C_3H_6O)_{0.02}SiO_{1.37}$
B: $(CH_3)_{0.9}(C_6H_5)_{0.4}(OH)_{0.07}(C_2H_5O)_{0.03}SiO_{1.3}$
C: a silicone-alkyd resin (KR-5206, a trade name, manufactured by Shin-Etsu Chemical Co.).
D: a silicone-epoxy resin (ES-1001N, a trade name, manufactured by the same company, supra),
E: a silicone-acrylate resin (KR-9706, a trade name, manufactured by the same company, supra)
F: a silicone polyester resin (KR-5203, a trade name, manufactured by the same company, supra)

Organopolysiloxanes a: $(CH_3)_{1.975}(NH_2CH_2CH_2NHCH_2CH_2CH_2-)_{0.025}(CH_3O)_{0.05}SiO_{0.975}$
b: $(CH_3)_2(HSCH_2CH_2CH_2)_{0.04}SiO_{0.98}$
c: $(CH_3)_{1.98}(HO-CHOHCH_2NHCH_2CH_2NHCH_2CH_2CH_2)_{0.083}-SiO_{0.9835}$

| | Formulation | | | | Evaluation of coated surface | | |
|---|---|---|---|---|---|---|---|
| | Silicone resin | | Organo-polysiloxane | | Peeling of adhesive tape, times | Static friction coefficient | Kinetic friction coefficient |
| Example No. | Type. | Amount added, parts | Type. | Amount added, parts | | | |
| 1 | A | 0.5 | a | 0.3 | 15 | 0.23 | 0.16 |
| 2 | A | 1.0 | a | 0.3 | 14 | 0.31 | 0.23 |
| 3 | A | 5.0 | a | 0.3 | 7 | 0.38 | 0.32 |
| 4 | B | 1.0 | a | 0.3 | 11 | 0.33 | 0.28 |
| 5 | C | 1.0 | a | 0.3 | 10 | 0.35 | 0.29 |
| 6 | D | 1.0 | a | 0.3 | 9 | 0.32 | 0.28 |
| 7 | E | 1.0 | a | 0.3 | 16 | 0.29 | 0.22 |
| 8 | F | 1.0 | a | 0.3 | 15 | 0.36 | 0.30 |
| 9 | A | 1.0 | b | 0.3 | 24 | 0.33 | 0.27 |
| 10 | B | 1.0 | b | 0.3 | 17 | 0.39 | 0.32 |
| 11 | C | 1.0 | b | 0.3 | 15 | 0.36 | 0.29 |
| 12 | D | 1.0 | b | 0.3 | 17 | 0.33 | 0.27 |
| 13 | E | 1.0 | b | 0.3 | 27 | 0.31 | 0.21 |
| 14 | F | 1.0 | b | 0.3 | 25 | 0.38 | 0.31 |
| 15 | A | 1.0 | — | — | 0 | 0.46 | 0.40 |
| 16 | E | 1.0 | — | — | 0 | 0.45 | 0.39 |
| 17 | F | 1.0 | — | — | 0 | 0.51 | 0.41 |
| 18 | — | — | a | 0.3 | 13 | 0.15 | 0.04 |
| 19 | — | — | b | 0.3 | 25 | 0.18 | 0.06 |
| 20 | — | — | — | — | 0 | 0.43 | 0.37 |

EXAMPLES 21 TO 39

An aminoalkyd resin coating material was prepared by mixing 100 parts of an aminoalkyd resin (Beckosol M-7622-55, a trade name, manu-factured by Dainippon Ink and Chemicals, Inc.), 3.5 parts of p-toluene sulfonic acid and 10 parts of a thinner. The coating material was then admixed with one of the silicone resins A to F and one of the organopolysiloxanes a and c each used in the preceding Examples 1 to 20 to prepare coating compositions No. 21 to No. 33 according to the present invention and coating compositions No. 34 to No. 39 for comparative purpose omitting either one of the admixed components. Test pieces of prefinished plywood were coated with these compositions using a film applicator in a coating amount of 20 to 25 g/m$^2$ and the films were cured by heating for 10 minutes at 70° C. after air-drying. Evaluation of the film properties was carried out of these test pieces to obtain the results summarized in Table 2 substantiating that combined use of the silicone resin and the organopolysiloxane was necessary in order to obtain improvements in both anti-blocking and slip-proofing at the same time.

| | Formulation | | | | Evaluation of coated surface | | |
|---|---|---|---|---|---|---|---|
| | Silicone resin | | Organo-polysiloxane | | Peeling of adhesive tape, times | Static friction coefficient | Kinetic friction coefficient |
| Example No. | Type | Amount added, parts | Type | Amount added, parts | | | |
| 21 | A | 0.2 | c | 0.5 | 51 | 0.21 | 0.11 |
| 22 | A | 0.5 | c | 0.5 | 52 | 0.32 | 0.25 |
| 23 | A | 1.0 | c | 0.5 | 49 | 0.35 | 0.28 |
| 24 | A | 3.0 | c | 0.5 | 43 | 0.36 | 0.31 |
| 25 | A | 5.0 | c | 0.5 | 36 | 0.38 | 0.32 |
| 26 | B | 1.0 | c | 0.5 | 37 | 0.37 | 0.31 |
| 27 | C | 1.0 | c | 0.5 | 50 | 0.36 | 0.30 |
| 28 | D | 1.0 | c | 0.5 | 35 | 0.34 | 0.27 |
| 29 | E | 1.0 | c | 0.5 | 55 | 0.33 | 0.27 |
| 30 | F | 1.0 | c | 0.5 | 53 | 0.38 | 0.33 |
| 31 | A | 1.0 | a | 0.5 | 20 | 0.32 | 0.23 |
| 32 | E | 1.0 | a | 0.5 | 22 | 0.29 | 0.20 |
| 33 | F | 1.0 | a | 0.5 | 25 | 0.34 | 0.26 |
| 34 | A | 1.0 | — | — | 0 | 0.38 | 0.33 |

-continued

| Example No. | Formulation Silicone resin Type | Formulation Silicone resin Amount added, parts | Formulation Organo-polysiloxane Type | Formulation Organo-polysiloxane Amount added, parts | Evaluation of coated surface Peeling of adhesive tape, times | Evaluation of coated surface Static friction coefficient | Evaluation of coated surface Kinetic friction coefficient |
|---|---|---|---|---|---|---|---|
| 35 | E | 1.0 | — | — | 0 | 0.41 | 0.34 |
| 36 | F | 1.0 | — | — | 0 | 0.45 | 0.35 |
| 37 | — | — | c | 0.5 | 47 | 0.13 | 0.04 |
| 38 | — | — | a | 0.5 | 23 | 0.12 | 0.03 |
| 39 | — | — | — | — | 0 | 0.36 | 0.30 |

What is claimed is:

1. A coating composition which comprises:

(1) 100 parts by weight of an organic resin component selected from the group consisting of phenol-formaldehyde resin coatings, aminoalkyd resin coatings, epoxy resin coatings, polyurethane coatings, and aqueous emulsion coatings based on polyvinyl chlorides, polyvinylacetates, or polyacrylate resins;

(2) 0.1 to 30 parts by weight of a silicone resin represented by the average unit formula $$(CH_3)_a(C_6H_5)_b(R^1)_c(OH)_d(OR^2)_e SiO_{(4-a-b-c-d-e)/2},$$

in which $R^1$ is a monovalent hydrocarbon group, $R^2$ is an alkyl group having 1 to 4 carbon atoms and the subscripts a, b and c are each zero or a positive number smaller than 2, the subscript d is zero or a positive number smaller than 1 and the subscript e is zero or a positive number smaller than 3, with the proviso that $0.7 < a+b+c < 2$ and $0.7 < a+b+c+e < 3$ or a modified silicone resin prepared from a methyl phenyl silicone resin represented by the average unit formula $$(CH_3)_f(C_6H_5)_g(OH)_h(OR^2)_i SiO_{(4-f-g-h-i)/2},$$

in which $R^2$ has the same meaning as defined above and the subscripts f and g are each zero or a positive number smaller than 2, the subscript h is a positive number not exceeding 2 and the subscript i is a positive number not exceeding 3 with the proviso that $f+g$ is larger than 0.7 but not exceeding 2, $h+i$ is larger than 0.2 but not exceeding 3 and $f+g+h+i$ is larger than 0.9 but not exceeding 3, by the dehydration or dealcoholation reaction between the hydroxyl groups or alkoxy groups contained therein with a compound represented by the general formula Z—OH, Z being a residual group selected from residual groups of alkyd resins, epoxy resins, acrylate resins, polyesters, phenol-formaldehyde resins, melamine-formaldehyde resins and polyurethanes; and (3) 0.001 to 15 parts by weight of an organopolysiloxane having substituting groups selected from the class consisting of aminoalkyl groups having the formula X—$R^3$—, wherein $R^3$ is an alkylene group having 1 to 12 carbon atoms and X is selected from the group consisting of $NH_2$—, $NH_2CH_2CH_2NH$— and $NH_2CH_2CH_2NHCH_2CH_2NH$—, mercaptoalkyl groups, and dihydroxyalkylamino-substituted hydrocarbon groups selected from the class consisting of HO—$CH_2CHOHCH_2NH$—, HO—$CH_2CHOHCH_2NHCH_2NH$— and $H_2CHOHCH_2NHCH_2CH_2N(CH_2CHOHCH_2OH)$— in the molecule thereof.

* * * * *